(12) United States Patent
Staudenmann

(10) Patent No.: US 8,350,438 B2
(45) Date of Patent: Jan. 8, 2013

(54) STATOR WINDING FOR AN ELECTRIC MOTOR

(75) Inventor: Christian Staudenmann, Mamishaus (CH)

(73) Assignee: Thyssenkrupp Presta AG, Eschen (LI)

( * ) Notice: Subject to any disclaimer, the term of this patent is extended or adjusted under 35 U.S.C. 154(b) by 422 days.

(21) Appl. No.: 12/738,963

(22) PCT Filed: Sep. 2, 2008

(86) PCT No.: PCT/CH2008/000364
§ 371 (c)(1),
(2), (4) Date: Apr. 20, 2010

(87) PCT Pub. No.: WO2009/055942
PCT Pub. Date: May 7, 2009

(65) Prior Publication Data
US 2010/0219713 A1   Sep. 2, 2010

(30) Foreign Application Priority Data
Oct. 30, 2007   (CH) ........................................ 1683/07

(51) Int. Cl.
*H02K 3/04* (2006.01)
*H02K 21/00* (2006.01)
*H02K 11/00* (2006.01)

(52) U.S. Cl. ........ 310/208; 310/180; 310/201; 310/187; 310/198; 310/71; 310/68 B; 29/596; 29/605

(58) Field of Classification Search .................. 310/207, 310/180, 184, 198, 208, 203, 187, 68 B, 71; 29/596, 605
See application file for complete search history.

(56) References Cited

U.S. PATENT DOCUMENTS

| | | | | |
|---|---|---|---|---|
| 5,299,749 A | * | 4/1994 | Thorogood et al. | 242/437.3 |
| 6,281,609 B1 | * | 8/2001 | Itami et al. | 310/68 B |
| 6,998,750 B2 | * | 2/2006 | Anma et al. | 310/198 |
| 7,388,311 B2 | * | 6/2008 | Bhargava | 310/184 |
| 2001/0033116 A1 | * | 10/2001 | Rose, Sr. | 310/180 |
| 2005/0012421 A1 | * | 1/2005 | Fukuda et al. | 310/179 |
| 2007/0182271 A1 | * | 8/2007 | Sugishima et al. | 310/218 |

FOREIGN PATENT DOCUMENTS
EP   1 499 003   1/2005

* cited by examiner

*Primary Examiner* — Quyen Leung
*Assistant Examiner* — Terrance Kenerly
(74) *Attorney, Agent, or Firm* — Notaro, Michalos & Zaccaria P.C.

(57) ABSTRACT

The invention relates to a stator for an electric motor comprising several poles (P) that are directed inwards towards the motor axis (2) and that surround a rotor (1), each pole (P) being provided with one winding (L) and the coils of the windings (L) being wound around the poles (P) one after the other without interruption. The stator (20) contains at least three pole groups (n), having at least three poles (P) and each group having the same number of poles (P). The windings (L) run out from the end face at least at the respective beginning and end of a pole group and are contacted there in such a way that the windings (L) associated with each pole group contain their own connection pair (U-U', V-V', W-W') and one connection (U', V', W') of each of these connection pairs is connected to a star point (Y) on the end face of the stator (20). The windings (L) are wound around the poles (P) one after the other with an alternating winding direction (WR), a single pole (P) having a winding (L) with the same winding direction as the preceding winding (L) of the preceding pole group (n) at an individual transition point between two pole groups (n).

7 Claims, 2 Drawing Sheets

STATOR WINDING FOR AN ELECTRIC MOTOR

FIELD AND BACKGROUND OF THE INVENTION

The invention relates to a stator for an electronically commutated electric motor, as well as to a method according to the invention.

The subject matter of the invention concerns the production of armature windings for an electronically commutated electric motor, which makes feasible implementing a construction method for high efficiency at high economy.

In power-assisted steering systems for motor vehicles especially high demands are made in particular of the motor drives. Due to the required highly compact type of construction and high required driving powers, correspondingly high efficiencies are necessary in electric motors. In addition, in such mass-produced products, the production costs in the automobile industry must be appropriately low, which makes necessary high economy in the production of such a drive. Therefore for such drives electronically commutated electric motors are increasingly employed, such as are described for example in EP 1 499 003 A1. Here the multiphase stator windings disclosed are wound successively for each phase onto the stator poles and its wires are connected with one another outside of the stator after the winding of each phase disposition to form a three-phase system. Each of the three phases contains three stator poles with the associated windings, each of which forms a pole group per phase. Within each pole group the winding direction from one pole to the next is disposed alternatingly and provided for all three pole groups equidirectionally and identically. Within prior art this has been the conventional approach for a long time in order to place windings around three-phase pole groups and in order to implement thereby a rotationally symmetric winding disposition for the generation of a rotary field for an electric motor.

Placing windings on compact stators is highly complex and expensive and especially the connection of a multiplicity of wires outside of the stator leads to additional expenditures and to undesirable stray fields which makes the disposition less economical.

A disposition improved in this regard is described in WO 2007/012207. Here the stator poles are all successively wound with one wire without interruption. The apportionment into the pole groups of the phases takes place thereby that at the desired sites the wires are carried out at the end side on the stator via a type of loop and carried back again, such that here at this site the wire packet can be contacted and, where necessary, can be cut open and contacted such that in the end region of the stator the desired pole groups can be wired to form the designated multiphase winding configuration. The winding of all poles herein takes place using a single wire from one pole to the other, always with alternating sense of winding. While placing the winding is hereby simplified, the end-side wiring to form the multiphase winding configuration herein takes place over the entire circumferential region of the stator. Relatively many terminal point sites become thereby necessary and the stray fields generated here are also distributed over the circumference and it is difficult to dispose here with optimal effect in the end side region sensors for the motor control.

SUMMARY OF THE INVENTION

The present invention addresses the problem of eliminating the disadvantages of the above cited prior art. It addresses in particular the problem of implementing a stator for an electronically commutated electric motor with armature windings on the stator poles, which is structured extremely compactly and to make feasible high efficiency with low stray losses of the stator field at high economy of production.

The problem is resolved according to the invention through the formation of a stator, as well as according to the method for operating an electric motor with such a stator. The dependent claims define further advantageous embodiments.

The problem is resolved according to the invention thereby that the stator for an electronically commutated electric motor comprises a cylindrical stator jacket with a multiplicity of poles of ferromagnetic material directed inwardly toward the motor axis, wherein the poles encompass a cylindrical hollow volume for receiving a rotor and wherein each pole is provided with one winding each, of a multiplicity of wire turns, for the formation of a magnetic armature, wherein the turns of the windings are disposed such that they are wound about the poles successively without interruption. The stator comprises at least three pole groups, each with the same number of poles with at least three poles each. These groups are disposed sequentially on the circumference of the stator in the form of a circle, the windings being carried out at the end side at least at the beginning and at the end of a pole group and here are at least partially cut open and so contacted here that the associated windings with respect to each pole group form a phase each. The windings of each pole group comprise a particular terminal point pair, wherein from each of these terminal pairs the one terminal is connected at the end side on the stator to form a star point. The windings on the poles are successively wound with alternating sense of winding, wherein a single pole at a sole transition between two pole groups bears a winding with the same sense of winding as the preceding last winding of the preceding pole group.

During the winding the poles are wound with conductor wire in a predefined sense of winding. Thereby a repeating sequence of the direction of the winding sense about the poles is formed. To each phase of the alternating electric field, with which the electric motor is activated, is dedicated a pole group formed of directly sequential circularly disposed poles. Thus the number of poles, by which the pole group is calculated, is equal to the quotient of the total number of poles divided by the number of phases of the alternating field. Corresponding to the repeating sequence of the direction of the winding sense, there results a pattern of the sense of winding, the winding pattern, for each individual pole group, which is comprised of a corresponding number of poles.

A highly economical disposition of a compact, electronically commutated or controlled and/or regulated electric motor with permanent magnet rotor is made feasible by implementing a three-phase motor configuration in which the stator includes 9 poles, and each phase is implemented as a pole group comprised of three poles which are wound successively with alternating sense of winding. According to the invention the windings of the poles of two of these pole groups is implemented in the identical winding direction and the windings of the third pole group in the reverse winding direction. At the transition from one pole group to the other, the winding directions of two adjacent poles at two pole group transitions are disposed counterdirectionally and at one transition equidirectionally.

This implementation permits the end-side wiring of the three-phase winding configuration in highly efficient manner and only a few cuts and contacting sites are necessary for this purpose. The polarity reversal of a single winding direction takes place such that the one star point terminal carried out here at the end side is spaced closer to the other star point terminals. Through this approach according to the invention the connection of the star point is highly simplified and the one terminal of the terminal pairs of the pole groups, which form the phase lead-outs, move closer together at the end side on the stator and thereby are located within half of the circle circumference of the stator. A possibly required terminal of the star point can in this case also be placed close to the terminals of the phase lead-outs and advantageously will also take place within this semicircle.

The terminals of the motor can hereby by realized in highly simplified manner since the number of wirings of the windings is minimized and no longer occupies the entire circle circumference. In the end-side region of the stator hereby also zones are generated which have no additional stray fields generated by the wiring. In these regions sensors, such as for example magnetic field sensors, can advantageously be disposed for acquiring operating data at correspondingly higher resolution. Such signals are further analyzed for acquiring the operating condition or state and/or for the control of the electronic motor circuitry.

The electric feed of the motor takes place via controlled or regulated electronic power circuitry which supplies the phase windings of the three pole groups with an alternating electric current, preferably an approximately sinusoidal current, with predetermined phase position such that, in the cylindrical hollow volume encompassed by the stator, at the rotor a magnetic field is generated rotating about the motor axis. The reversal of the winding direction of the one winding in one of the pole groups must be appropriately taken into consideration in the activation.

The various features of novelty which characterize the invention are pointed out with particularity in the claims annexed to and forming a part of this disclosure and are entirely based on the Swiss priority application no. 1683/07 filed Oct. 30, 2007, and International Patent Application No. PCT/CH2008/000364 filed Sep. 2, 2008, which is incorporated here by reference.

BRIEF DESCRIPTION OF THE DRAWINGS

In the following the invention will be explained in further detail by example and with schematic figures. In the drawing depict.

DESCRIPTION OF THE PREFERRED EMBODIMENTS

An electronically commutated electric motor is substantially comprised of a stator 20, implemented cylindrically with a cylindrical jacket 20a and with poles P (in the Figures denoted by example by $P_1$, $P_2$, $P_3$, $P_4$, $P_5$, $P_6$, $P_7$, $P_8$, $P_9$) of ferromagnetic material, which are oriented toward the interior of the cylinder and toward its central motor axis 2, wherein the poles P bear windings L (in the Figures as example denoted by $LU_1$, $LU_2$, $LU_3$, $LV_1$, $LV_2$, $LV_3$, $LW_1$, $LW_2$, $LW_3$) and in this manner are implemented as armature winding. In the center of the hollow volume of the stator cylinder is disposed a rotor 1 which can freely rotate about the cylinder axis 2 and which includes permanent magnets oriented toward the poles P.

Figure 1:
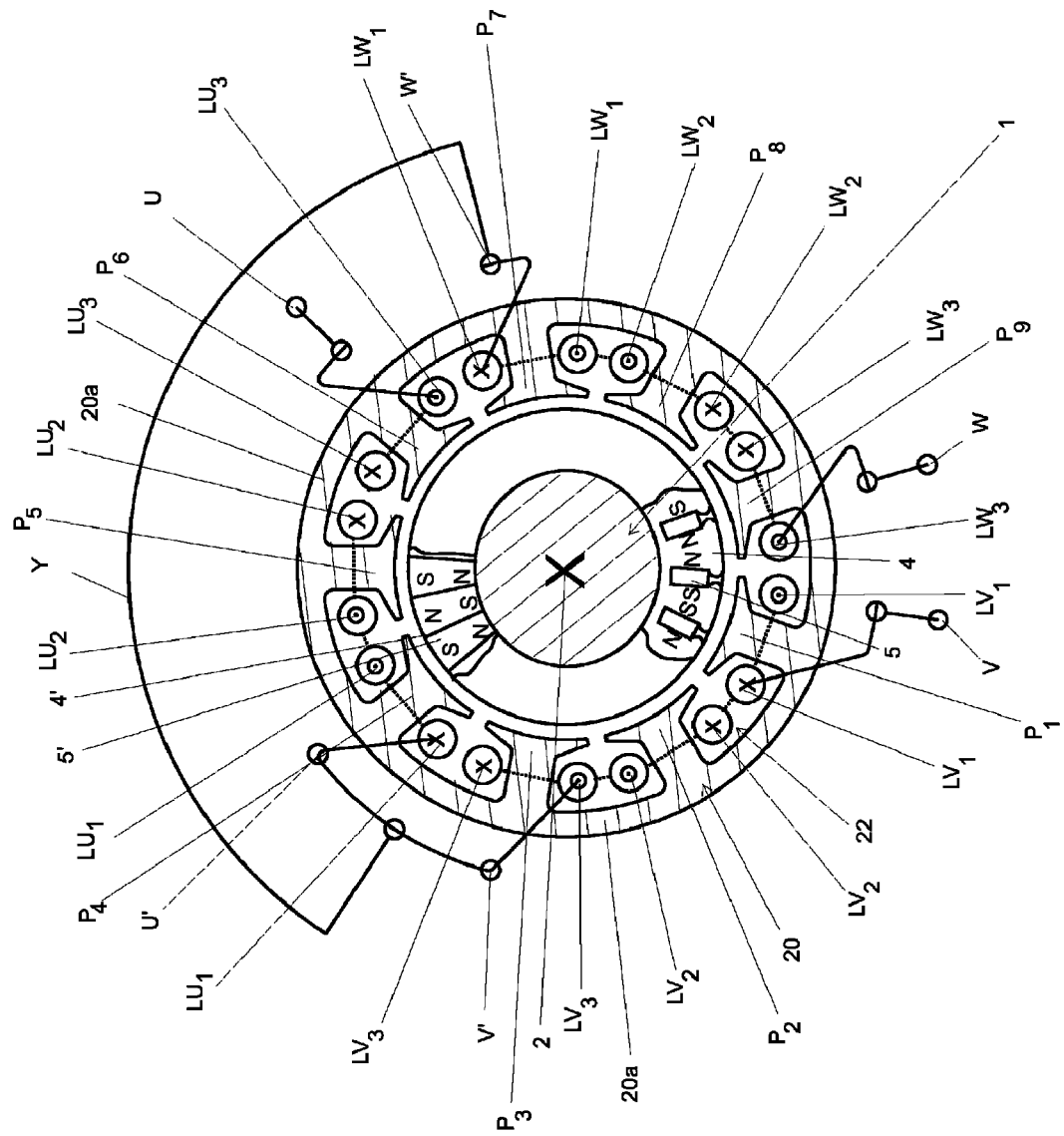
FIG. 1 schematically a winding schema for the implementation according to the invention of a 9-pole stator with its implementation of the wire windings and terminal points. The jacket of the cylindrical stator is depicted in the devolved form, FIG. 2 schematically and in cross section an electronically commutated motor with rotor and stator according to FIG. 1.

As a rule, the windings L are so electrically connected or wired with one another that the windings form a multiphase system, in particular a three-phase system LU, LV, LW, for the generation of a rotary field which through an electronic feed into the windings via the winding terminals U, V, W of the formed phase windings and the star point Y, in which the other three winding terminals U', V', W' are combined. This rotary field subsequently sets the rotor with the permanent magnets 5 disposed thereon into a rotating motion. The permanent magnets 5, 5' are so disposed on the rotor that on the circumference rotor poles 4, 4' are implemented with alternating magnetic polarity. Magnets 5' can, as shown in FIG. 1 (in the upper portion of the depiction) in cross section, be directly magnetized in the radial direction away from the motor axis 2 and be positioned with magnetic poles 4' alternating on the circumference in the rotor such that these magnet poles are oriented closely spaced apart from the stator poles P. A further, especially preferred, disposition of the permanent magnets 5, as depicted in FIG. 1 in the lower portion of the depiction, is also oriented radially with respect to the motor axis 2 in rotor 1 with interspaced ferromagnetic material which in this case forms the rotor poles 4. In this case the permanent magnets are magnetized in the circumferential direction and within a ferromagnetic rotor pole 4 oriented equipolarly and alternating from one rotor pole 4 to the next.

Figure 2:
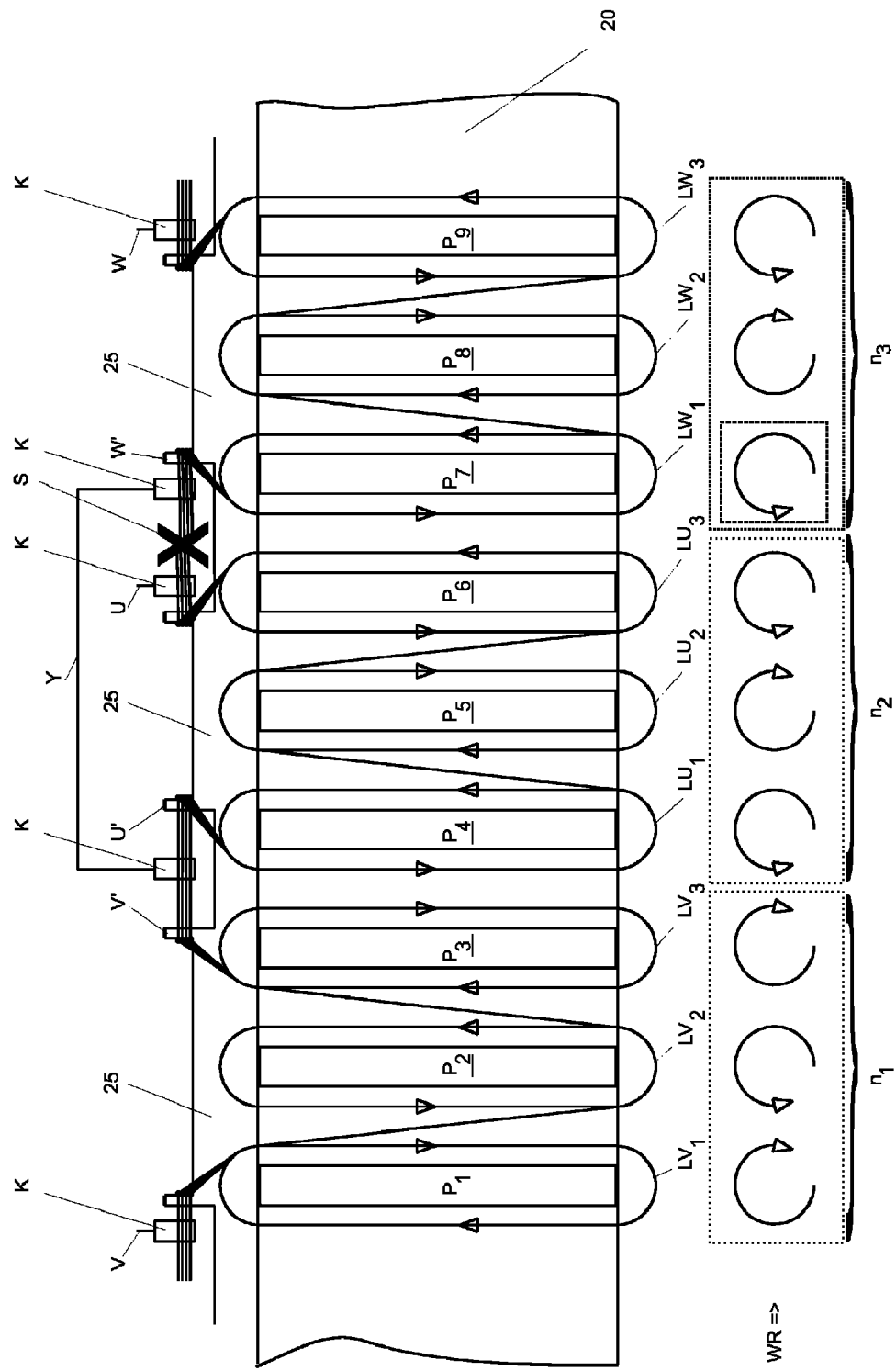

In the following, in connection with a preferred example of an electric motor with a stator 20 with 9 poles $P_1$ to $P_9$, the invention is depicted in FIG. 2 in cross section and in FIG. 1 in a winding schema with rolled out cylinder jacket. The windings LU, LV, LW are successively wound in a single pass. For example, at the winding beginning the wire for the winding $LV_1$ about pole 1 is fixed and wound with a multiplicity of turns about pole 1 and subsequently carried onto pole 2, where, again, a multiplicity of turns are deposited corresponding to the winding direction WR. The winding $LV_3$ is subsequently deposited on pole $P_3$. These three windings $LV_{1-3}$ were deposited onto the poles $P_1$ to $P_3$ of the first of the three-pole groups $n_1$ and form a first phase V. After completing the winding $LV_3$ about pole $P_3$, the wire is carried at the end side on stator 20 in a short loop away from the pole region and out of it and subsequently, via an insulating support 25, back again to the next pole $P_4$, where winding $LU_1$ is deposited and subsequently the winding $LU_2$ about pole $P_5$ and subsequently the winding $LU_3$ is wound about pole $P_6$ for the implementation of a second phase U with the pole group $n_2$. After completing this winding $LU_3$, the wire is again carried out in a loop at the end side and again carried back via the support insulator 25 for establishing the third phase W with the three windings $LW_{1-3}$ about poles $P_7$ to $P_9$ forming the pole group $n_3$. The carried-out wire loops form at the end side readily accessible wire transitions from one phase to the next. Such wire transitions are carried out at sites at which contact sites K are required, on the one hand, in order to interconnect a three-phase winding system and, on the other hand, to establish the power supplies. The wire transitions are advantageously disposed on the one end side of the cylindrical stator 20 and carried via insulating supports 25 and positioned.

In the preferred example according to FIG. 1, depending on the embodiment a single wire or a multiplicity of wires are shown having been wound concurrently successively onto the 9 poles $P_1$ to $P_9$ and thus form each the winding packets $LU_1$, $LU_2$, $LU_3$ and $LV_1$, $LV_2$, $LV_3$, and $LW_1$, $LW_2$, $LW_3$ with three windings each. Each winding packet defines thereby one phase, thus a total of three phases U, V, W with the three pole groups $n_1$, $n_2$, $n_3$. Thereby that the wires are wound in a single pass results solely one winding beginning and one winding end during the winding process, where the wires must be retained. Through the contacting K and through the cut or separation S of the corresponding wire transitions the windings are interconnected such that a three-phase system with the three phase terminals U, V, W and one star point connection Y results. In the star point connection Y the three phase lead-outs U', V', W' of the three winding packets are combined in known manner to the star point. In the case of the 9-pole arrangement, at the end side only the winding wire beginning and the winding wire end, for example at poles $P_1$ and $P_9$, and, for example, the wire transitions between poles $P_3$ and $P_4$ as well as between poles $P_6$ and $P_7$, need to be contacted. For this purpose the transitions between poles $P_6$ and $P_7$ are provided with a cut or separation S. Depending on the winding implementation, the winding beginning and the winding end can also take place by cutting the wire packets at this site. In the most favorable case, in the nine-pole implementation of stator 20 only five contacts K are necessary for establishing the three phase terminals U, V, W and of star point Y, as is depicted in FIGS. 1 and 2.

According to the invention, the sense of winding is not formed identically for the windings of the pole groups $n_1$, $n_2$, $n_3$ in repeating sequence, as has been conventional until now, but rather is implemented for one pole group $n_1$ precisely with reverse sense of winding. This is attained in that the sense of winding of the windings on two successive poles $P_6$, $P_7$ precisely in a single change from one of the pole groups $n_2$ to the next pole group $n_3$ is equidirectionally with respect to one another while the sense of winding of the windings always alternates with the change between all remaining poles.

The stator for an electronically commutated electric motor, comprises according to the present invention a cylindrical stator jacket 20a and a multiplicity of poles (P) of ferromagnetic material directed inwardly toward the motor axis 2, wherein the poles P encompass a cylindrical hollow volume for receiving a rotor 1 and each pole P is provided with one winding L each with a multiplicity of wire turns for implementing a magnetic armature. The turns of windings L are wound without interruption successively about poles P and the stator 20 comprises at least three pole groups n, each with the same number of poles P and each of which comprises at least 3 poles P. These are successively distributed circularly at the circumference of stator 20, wherein the windings L, at least at each beginning and end of a pole group, are carried out at the end side and here at least partially cut open and here are contacted such that the associated windings L to each pole group, each of which forms a phase, include their own terminal pair U-U', V-V', W-W'. Of each of these terminal pairs, the one terminal U', V', W' is connected at the end side on stator 20 to form a star point Y. The windings L at poles P are herein successively wound with alternating sense of winding WR, wherein a single pole P at a sole transition between two pole groups n bears a winding L with the same sense of winding as the preceding last winding L of the preceding pole group n.

In FIG. 1 beneath the devolution of the cylindrical stator 20 is shown the winding schema associated with poles P with the individual winding directions WR. It is here evident that for each winding L the winding direction for each pole P alternates successively except for the first winding $LW_1$ of the third pole group $n_3$, with respect to the preceding third winding $LU_3$ of the second preceding pole group $n_2$. These adjacent windings $LU_3$ and $LW_1$ of the two adjacent pole groups have the same winding direction WR. Following this, the winding directions WR alternate again.

The winding schema also follows the rule that within each pole group n the winding directions of the individual windings L alternate and that the pole groups n include the same winding directions WR except for one pole group n. In the present example the pole groups $n_2$ and $n_3$ have the same grouping of alternating winding directions WR within the pole group and the first pole group $n_1$ has a reverse sequence of the alternating windings L. The shifted winding arrangement of a pole group n can also be disposed in a different sequence within the circumference or the devolution of stator 20. In this case the end-side terminal point regions are thereby displaced depending on the requirement. It is now especially important that through the proposed approach the one star point terminal, for example W', carried out here at the end side, moves closer to the other two star point terminals U', V'. Thereby alone is the wiring complexity and expenditure decreased and focused onto a smaller region. In addition, it becomes feasible to dispose the terminals U, V, W of the terminal pairs of the pole groups (n), which form the phase lead-outs at the end side on stator 20, such that they are located within half of the circle circumference of stator 20. In the most favorable case not only the phase terminals U, V, W can be accommodated within one half, but rather also the star point terminal Y. In order to be able to observe this schema, the total pole number must be odd-numbered and correspond to a multiple of the number of phases. Especially suitable is herein the depicted nine-pole stator arrangement 20.

During operation the windings L of pole groups n attention must herein be paid that the activation with an alternating electric current takes place such that a revolving, rotating magnetic field forms at the rotor 1 in the cylindrical hollow volume encompassed by the stator 20. Thus the correct phase position of the electric feed of the phase winding must be respected. The wiring in the end-side region of the stator and the establishment of the electric motor terminals can subsequently be implemented especially simply and can also be realized such that it is highly compact and cost-effective. This can be implemented for example using simple contact ring elements and/or busbar elements with, for example, integrated plug terminals. It is herein especially important that now a large region is available at the stator 20 at the end side without wiring elements which generate stray fields, and that now in this region motor elements, such as poles P and pole windings L are accessible without hindrance. This region, facing away from the phase lead-outs U, V, W and the star point connection Y, now makes it feasible to dispose sensors here, preferably magnetic field sensors, at reduced interference effects. With such sensors, for example, the operating conditions of the motor can be acquired and these can be utilized also for the control and regulation of the motor. The useful signal is thereby increased and a better response behavior and a more precise operation of the motor is feasible. This is especially important in the case of auxiliary drives in steering systems.

The invention claimed is:

1. Stator for an electronically commutated electric motor with a cylindrical stator jacket (20a) and a multiplicity of poles (P) of ferromagnetic material directed inwardly toward the motor axis (2), wherein the poles (P) encompass a cylindrical hollow volume for receiving a rotor (1) and wherein each pole (P) is provided with one winding (L) each with a multiplicity of wire turns for the implementation of a magnetic armature, wherein the turns of the windings (L) are disposed wound successively without interruption about poles (P) and that the stator (20) comprises at least three pole groups (n), each with the same number of poles (P) and at least 3 poles (P) each, and these are disposed sequentially at the circumference of the stator (20) distributed circularly, wherein the windings (L) are carried out at the end side at least at each beginning and end of a pole group and here are at least partially cut open and are contacted here such that the associated windings (L) to each pole group, which forms a phase, comprise their own terminal point pair (U-U', V-V', W-W') and that from each of these terminal pairs the one terminal (U', V', W') is connected at the end side on stator (20) to form a star point (Y), characterized in that the windings (L) at the poles (P) successively are wound with alternating sense of winding (WR), wherein a single pole (P) at a sole transition between two pole groups (n) bears a winding (L) with the same sense of winding as the preceding last winding (L) of the preceding pole group (n), wherein the total number of poles is odd and corresponds to a multiple of the number of phases, and including sensors disposed in the end side region of the other half of the circumference of the stator (20), facing away from the phase lead-outs (U, V, W) and the star point connection (Y).

2. Stator as claimed in claim 1, characterized in that precisely one of the pole groups has a winding pattern which is counterdirectional to all other pole groups.

3. Stator as claimed in claim 1, characterized in that the stator (20) is implemented as a nine-pole stator with three pole groups (n) and each pole group (n) comprises three poles (P).

4. Stator as claimed in claim 3 characterized in that in the end-side region of the other half of the circle circumference of the stator (20), facing away from the phase lead-outs (U, V, W) and the star point connection (Y), sensors are disposed.

5. Stator as claimed in claim 3 characterized in that the sensors are magnetic field sensors.

6. Stator as claimed in claim 1, characterized in that the terminals (U, V, W) of the terminal pairs of the pole groups (n), which form the phase lead-outs at the end side on the stator (20), are disposed such that they are located within half of the circle circumference of the stator (20).

7. Method for the operation of an electric motor with a stator (20) as claimed in claim 1, characterized in that during operation the windings (L) of the pole groups (n) are activated with an alternating electric current such that a revolving, rotating magnetic field is formed on rotor (1) in the cylindrical hollow volume encompassed by the stator (20).

* * * * *